June 1, 1926.  1,586,721

W. A. TRYON

SHACKLE

Filed August 28, 1923

INVENTOR
William A. Tryon.

WITNESS
F. J. Hartman.

ATTORNEYS

Patented June 1, 1926.

1,586,721

UNITED STATES PATENT OFFICE.

WILLIAM A. TRYON, OF NEW YORK, N. Y.

SHACKLE.

Application filed August 28, 1923. Serial No. 659,725.

My invention relates to shackles more especially adapted for yieldingly connecting the springs of automobiles to the frame or chassis parts thereof, a principal object of the invention being to provide a shackle adapted for this purpose and embodying means for automatically compensating for wear between the relatively moving parts of the shackle, thereby insuring a proper operating fit between them even after long periods of use and eliminating looseness and consequent rattling.

Further objects of the invention are to provide a spring shackle having the foregoing characteristics which may be manufactured economically, which is adapted for attachment to existing forms of vehicles without alteration thereof, which is simple in design, embodies but a relatively small number of parts and is not liable to get out of order under conditions of use, and which requires no attention or adjustment after installation.

Still further objects are to provide a shackle of the aforesaid type which is adapted to contain a relatively large body of lubricant in a position to effectively lubricate the relatively moving surfaces.

My invention further includes all of the other objects and novel features of construction and arrangement hereinafter more particularly referred to or which may be apparent from the accompanying drawings forming a part hereof.

Figure 1:
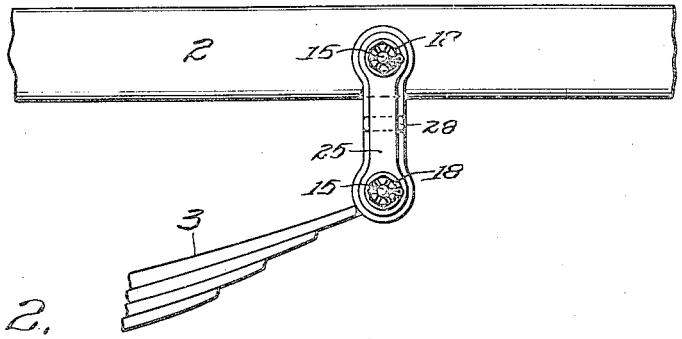
Figure 2:
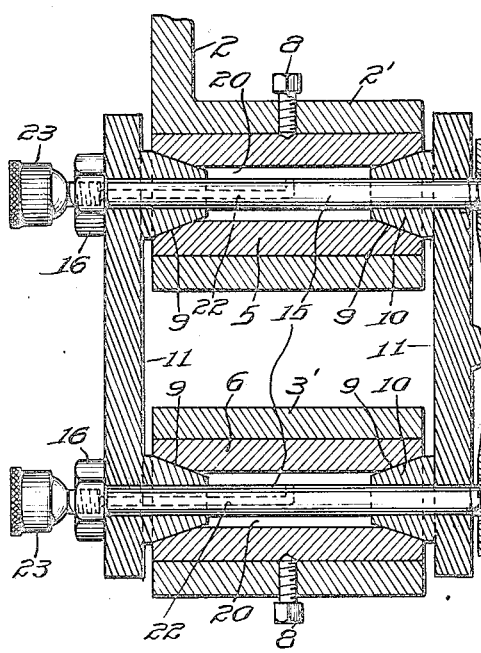
Figures 3, 4:
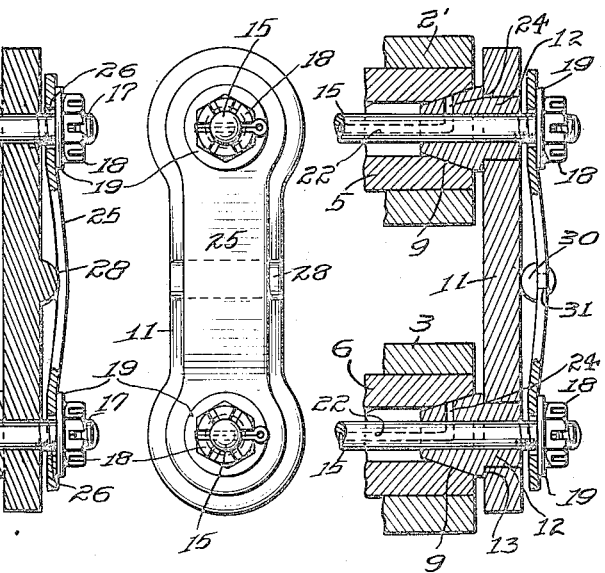
Figure 5:
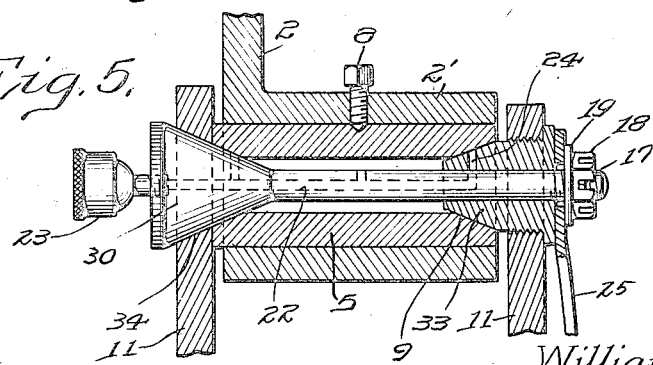

In the said drawings I have illustrated, and will now proceed to describe, certain embodiments of my invention as exemplified in spring shackles suitable for installation upon automobiles, Figure 1 showing, in side elevation, a portion of an automobile frame and a portion of the vehicle spring connected thereto by my improved shackle. Fig. 2 is a view, principally in central vertical section, of a preferred form of the shackle, and Fig. 3 an end elevation thereof. Fig. 4 is a fragmentary view, principally in central vertical section, illustrating a slightly modified form of the invention and Fig. 5 is also a fragmentary view in similar section showing a further slightly modified form. Like numerals are used to designate corresponding parts in the several figures.

Referring more particularly to that form of the invention shown in Figs. 1, 2 and 3, 2 designates the chassis of the automobile to which the supporting spring 3 is pivotally connected by means of my improved shackle. The frame or chassis is ordinarily provided with a boss or enlargement 2' and the end of the spring with an eye 3', as shown in Fig. 2, in which are respectively disposed the bushings 5 and 6 of the shackle, these bushings being rigidly and non-rotatably secured in the parts in which they are housed in any suitable manner, conveniently by pressing them tightly in place for frictional retention or by means of set screws 8 extending through the parts and into the bushings, or in any other desired way.

Each bushing is hollow and interiorly outwardly tapered at its ends in opposite directions, as at 9, 9, to provide bearing surfaces for the reception of the trunnions or bearing cones 10 which are carried by and arranged to extend inwardly from the side links 11 disposed one on each side of the bushings. I generally prefer to make each pair of trunnions or bearing cones integral with the adjacent link as shown by Fig. 2, as by forming the cones and the body of the link from a single piece of metal which may be hardened if desired after the machining operations are completed, but under certain conditions it may be desirable to form the trunnions separately from the links, as shown in Fig. 4, and operatively secure them thereto conveniently by providing each trunnion with a cylindrical outer end or neck 12 of smaller diameter than the base of the cone-shaped part of the trunnion, and then forcing this neck into an aperture of suitable size in the link until the shoulder 13 on the trunnion contacts with the face of the link, the parts being thereafter retained in assembled relation by frictional engagement, or, if desired, other suitable methods of forming the trunnions and securing them in the links may be employed.

The links themselves are conveniently substantially in the form of plates with rounded ends and each link is provided with two of the trunnions disposed more or less adjacent its extremities to project from its inner face for registration with the correspondingly tapered bores in the bushings 5 and 6, and means are provided for operatively maintaining the links adjacent the bushings and the trunnions in the bores thereof. Said means, in the preferred embodiment of the shackle, may comprise a pair of bolts 15 arranged to extend centrally through the aligned pairs of trunnions which are suitably bored for the purpose, the bolts being provided with heads 16 on one end and threaded as at 17 on the other for the reception of nuts 18 which may be castellated to receive cotter pins for preventing them from backing off in the usual way. Preferably the diameter of the bolts is somewhat less than that of the smaller ends of the trunnions so as to leave an annular lubricant retaining chamber or reservoir 20 surrounding the central portion of the bolt when the latter is in position, and for introducing grease or oil into this reservoir the bolts may be provided with oil passages communicating with grease or oil cups 23 carried by the heads of the bolts. The provision of the lubricant chamber in the manner aforesaid results in the maintenance of a considerable body of lubricant adjacent the contacting surfaces of the trunnions and of the bushings at all times in position to work out on said surfaces and effect their adequate lubrication. If desired, oil passages 24 may be run to the surfaces of the trunnions as in Fig. 4 and arranged to communicate with the passages 22 in the bolts so as to conduct lubricant directly to the former, thus supplementing the lubrication effected by the lubricant which works between the surfaces from the reservoir.

In order to continuously urge the links inwardly towards the bushings when the parts are assembled and thus keep the trunnions closely pressed into the latter, as well as to automatically compensate for any wear which may take place between the trunnions and the surfaces of the bushings on which they bear, I provide resilient means, in association with a suitable fulcrum, adapted for compression beneath the nuts 18 in such manner that the aforesaid functions will be satisfactorily accomplished. More particularly I may provide a preferably initially flat plate 25 of suitably tempered or spring metal having holes or slots 26 formed adjacent its ends for the passage of the bolts 15, and dispose the plate adjacent one of the links on the opposite side thereof from that from which the trunnions project with the ends of the bolts extending through the holes 26 for the reception of the nuts 18, washers 19 being disposed between the plate and the nuts if desired. Since the plate is preferably initially flat, it is requisite, in order to effect suitable compression of the plate when the nuts are set up, to provide a fulcrum over which the plate can be bent, and for this purpose I may form an outwardly projecting rib 28 on the face of the link and approximately midway between its ends to extend substantially transversely across the link, the rib being conveniently integral with the latter and formed of a shape to give a good bearing for the plate.

Thus when the plate is positioned over the rib and the nuts 18 set up, the ends of the plate are forced inwardly towards the link, as best shown in Figs. 2 and 4, with consequent tensioning of the plate which thereby becomes operative to press the links inwardly and urge the trunnions to their respective seats in the bushings, the amount of pressure exerted being regulated by the degree of compression of the plate effected by the distance which the nuts are screwed inwardly along their respective bolts, the latter being preferably of sufficient length to afford suitable capacity for adjustment in this regard.

Instead of forming the fulcrum as an integral part of the link or as operatively integral therewith, I may in certain cases arrange the same as an operative part of the plate, as shown in Fig. 4, in which case the plate may be provided with a transversely extending bar, rib or lug 30 having one or more necks 31 projecting from its outer face and extended through suitable openings in the plate, the ends of the necks being headed over on the outer face of the plate so as to secure the lug thereto.

Under certain circumstances I find it of advantage to form one of the trunnions integral with each bolt, as shown in Fig. 5, a trunnion 33 being in such cases substituted for the head of the bolt and arranged to be drawn into and extend through a suitably inwardly tapered hole 34 in one of the links 11 and thence into the tapered hole in the bushing 5 or 6 as the case may be. Where such construction is employed, it is desirable to extend the bushing beyond the face of the chassis 2 for a short distance so as to engage the inner face of the link and retain the latter slightly spaced from the end of the bushing and out of engagement with the chassis. In said figure I have shown the opposite trunnion 35, through which the bolt extends, as formed separately from its supporting link 11 and provided with an exteriorly threaded neck of substantially the diameter of the base of the cone part of the trunnion, said neck being adapted to be screwed into a suitably interiorly threaded hole formed in the link until the flange 36 with which the outer end of the trunnion is provided engages the outer face of the link, but it will, of course, be understood that, if desired, the trunnion may be formed integral with the link or formed separately and pressed thereinto as described in connection with other forms of the invention to which reference has hitherto been made.

While the inclination of the surfaces of the trunnions with respect to the central axis thereof is capable of considerable variation, I have found in practice that most satisfactory results are obtained when the angle between the axis of each trunnion and its outer inclined surface is approximately twenty-two and one-half degrees, the inclined or tapered interior surface 9 of the bushing being, of course, formed in correspondence therewith. When tapered in this manner the trunnions provide adequate support for the bushings and parts carried thereby without excessive friction or binding between the bearing surfaces even when the trunnions are tightly pressed or drawn into the bushings through the action of the plates 25 after the setting up of the nuts 18, with the resultant long life and satisfactory operation of the parts.

It will thus be apparent that I have provided a shackle wherein the links, when it is desirable to reduce the over-all width of the shackle to a minimum, may be made relatively thin without sacrifice of bearing surface and with corresponding reduction in weight of the whole shackle, and in which any wear which may occur between the bushings and the trunnions will be immediately compensated, with consequent prevention of any looseness and resulting rattle between the parts. Moreover, in a shackle constructed in accordance with my invention, the parts may be readily adjusted when desired so as to vary the amount of pressure exerted to force the trunnions to their seats in the bushings, although ordinarily once the shackle is assembled on the automobile and suitable adjustment of the nuts 18 made to induce the desired compression of the plate 25, it is thereafter unnecessary to accord the shackle any attention whatsoever, the trunnions being automatically maintained in proper engagement with the bushings irrespective of any wear which may occur between the bearing surfaces.

While I have herein described and illustrated with considerable particularity certain embodiments of my invention as exemplified in spring shackles of slightly differing forms, I do not thereby desire or intend to in any way limit myself thereto, as various changes and modifications may be made, if desired, in the design, construction and arrangement of the several parts to suitably adapt the shackle for installation on different types of automobiles or for other purposes without departing from the spirit and scope of the invention as defined in the appended claims.

Having thus described my invention, what I claim and desire to protect by Letters Patent of the United States, is:

1. A spring shackle comprising hollow bushings adapted for reception in the spring parts and chassis parts of a vehicle, each bushing being inwardly tapered from its opposite ends, links extending between the ends of said bushings and provided with inwardly projecting trunnions extending into the tapered portions of the bushings, and a single spring adapted to automatically maintain the trunnions in the bushings and to take up wear therebetween.

2. A spring shackle comprising bushings adapted to be seated respectively in the chassis and in the spring of a vehicle, a pair of links extending between the ends of said bushings and having inturned tapering trunnions adjacent their ends adapted to project into and receive a working bearing in the bushings, a single spring disposed adjacent one of the links, and means operative to tension the spring to press the parts together and automatically take up wear between said trunnions and said bushings.

3. A spring shackle comprising bushings adapted to be seated respectively in the chassis and in the spring of a vehicle, a pair of links extending between the bushings on opposite sides thereof and having inturned tapering trunnions adjacent their ends adapted to project into and receive a working bearing in the bushings, a single initially flat spring plate disposed adjacent the outer face of one of the links, and means operative to flex the plate to cause the links to be pressed together and to effect automatic compensation for wear between the trunnions and the bushings.

4. A spring shackle comprising a pair of bushings, each inwardly oppositely tapered from its ends, links yieldably connecting said bushings and disposed adjacent the ends thereof, each link being provided with inwardly projecting tapered trunnions extending into the tapered portions of the bushings, an initially flat spring plate disposed adjacent one of the links, and means for flexing said plate so as to draw said links together and press the trunnions into the bushings.

5. A spring shackle comprising a pair of hollow bushings respectively adapted to be seated in the chassis and in the spring of a vehicle, the inner wall of each bushing being angularly outwardly inclined adjacent its ends, a pair of links extending between the bushings but out of contact therewith and disposed adjacent the ends thereof, each link having a pair of inwardly directed tapered trunnions extending from its inner face and adapted to be received in the ends of the bushings, bolts extending through the links and through the bushings but out of contact therewith, an initially flat spring plate disposed adjacent one of the links, a fulcrum disposed between the link and the plate adjacent the center of the latter, and nuts carried by the bolts and operative to tension the plate by bending its ends inwardly to thereby press the links together and maintain the trunnions in their seats in the bushings.

6. A spring shackle comprising a pair of hollow bushings respectively adapted to be seated in the chassis and in the spring of a vehicle, the inner wall of each bushing being angularly outwardly inclined adjacent its ends, a pair of links extending between the bushings and disposed adjacent the ends thereof, each link having a pair of inwardly directed tapered trunnions projecting from its inner face and adapted to be received in the ends of the bushings, an initially flat spring plate disposed adjacent the outer face of one of the links, bolts extending through the links, trunnions and bushings but out of contact with the latter and also through the ends of the spring plate, a fulcrum interposed between the spring plate and the link and adapted to maintain the center of the plate in spaced relation with the link, and nuts carried by the bolts on the opposite side of the plate and adapted to draw the ends of the plate toward the link to flex the plate.

7. A spring shackle comprising a bushing adapted for reception in the chassis of a vehicle and a bushing adapted for reception in the spring thereof, each bushing having an inwardly tapered bearing surface at each end, a pair of cooperating links having tapered bearing trunnions adapted for cooperation with said surfaces, a bolt extending through each bushing and the adjacent ends of the links, a single spring plate disposed over the ends of the bolts and on the outside of one of the links, means for maintaining the center of the plate spaced from the adjacent link, and means carried by the bolts whereby the ends of the plate may be drawn toward the link to flex the plate.

8. A spring shackle comprising a bushing adapted for reception in the chassis of a vehicle and a bushing adapted for reception in the spring thereof, each bushing having an inwardly tapered bearing surface at each end, a pair of links having tapered bearing trunnions adapted for cooperation with said surfaces, a bolt extending through each bushing and the adjacent ends of the links, a single initially flat spring plate disposed over the ends of the bolts on the outside of one of the links, means for maintaining the center of the plate spaced from the adjacent link, and adjustable means carried by the bolts operative to draw the ends of the plate toward the link to flex the plate and place it under tension.

9. A spring shackle for a vehicle comprising a pair of hollow bushings respectively adapted for reception in the chassis and spring parts of a vehicle, a pair of cooperating links extending between the bushings adjacent the ends thereof, trunnions carried by the links adapted to be received in the ends of the bushings, bolts extending through the links and the trunnions and through the bushings, and of less diameter than the interior of the bushings whereby a lubricant reservoir is formed in the interior of each bushing and closed at its ends by the trunnions, means for conveying lubricant to said reservoir, and spring means adapted to constantly urge the links together and maintain the trunnions seated in the bushings.

In witness whereof, I have hereunto set my hand this 25th day of August, 1923.

WILLIAM A. TRYON.